US010937060B2

(12) United States Patent
Deluca et al.

(10) Patent No.: US 10,937,060 B2
(45) Date of Patent: Mar. 2, 2021

(54) INTELLIGENT LOCATION BASED NOTIFICATION

(71) Applicant: International Business Machines Corporation, Armonk, NY (US)

(72) Inventors: Lisa Seacat Deluca, Baltimore, MD (US); Jeremy A. Greenberger, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 608 days.

(21) Appl. No.: 15/494,908

(22) Filed: Apr. 24, 2017

(65) Prior Publication Data

US 2018/0308128 A1    Oct. 25, 2018

(51) Int. Cl.
| | |
|---|---|
| G06Q 30/02 | (2012.01) |
| H04L 29/08 | (2006.01) |
| H04W 4/021 | (2018.01) |
| G06N 5/04 | (2006.01) |
| G06Q 10/10 | (2012.01) |
| H04W 4/21 | (2018.01) |
| G06N 20/00 | (2019.01) |
| H04W 4/23 | (2018.01) |

(52) U.S. Cl.
CPC ........... *G06Q 30/0261* (2013.01); *G06N 5/04* (2013.01); *G06N 20/00* (2019.01); *G06Q 10/1095* (2013.01); *G06Q 30/0269* (2013.01); *H04L 67/22* (2013.01); *H04L 67/306* (2013.01); *H04W 4/021* (2013.01); *H04W 4/21* (2018.02); *H04W 4/23* (2018.02)

(58) Field of Classification Search
CPC .................................................. G06Q 30/0261
USPC ..................................................... 705/14.58
See application file for complete search history.

(56) References Cited

U.S. PATENT DOCUMENTS

| | | | |
|---|---|---|---|
| 2012/0130796 A1* | 5/2012 | Busch ..................... | G06Q 30/02 705/14.36 |
| 2014/0129324 A1* | 5/2014 | Spivack ............. | G06Q 30/0269 705/14.45 |
| 2015/0120453 A1 | 4/2015 | Lee et al. | |
| 2015/0242890 A1* | 8/2015 | Bass .................. | G06Q 30/0252 705/14.5 |
| 2016/0196577 A1* | 7/2016 | Reese ................ | G06Q 30/0259 705/14.5 |
| 2016/0316324 A1 | 10/2016 | Sahadi et al. | |

FOREIGN PATENT DOCUMENTS

EP            2916280 A1      9/2015

* cited by examiner

*Primary Examiner* — Azam A Ansari
(74) *Attorney, Agent, or Firm* — Stephanie Carusillo Esq.; George S. Blasiak Esq.; Heslin Rothenberg Farley & Mesiti P.C.

(57) ABSTRACT

Methods, computer program products, and systems are presented. The method computer program products, and systems can include, for instance: adjusting a transmission parameter associated to a notification process for outputting a notification; determining a priority of users currently within an area of interest, the area of interest including an area of a venue; and outputting the notification to a subset of the users based on the adjusting and the determining.

20 Claims, 8 Drawing Sheets

INTELLIGENT LOCATION BASED NOTIFICATION

BACKGROUND

The present disclosure relates generally to advertising systems, and more specifically pertains to gathering or updating customer profile preferences by presenting a plethora of coupon selection choices and then using the gathered profiles to enable targeted, relevant, and/or personalized advertising.

Retailers have developed customer loyalty programs that allow customer profiles to be created for repeat customers. Customer profiles can include a wealth of information about the customer, including demographics, income levels, spending patterns, and purchasing preferences. Customer profiles are increasingly being recognized as key assets for retailers, as they are key elements in constructing targeted advertising campaigns and other forms of customer engagements, and also affect store merchandising plans and operations. Many retailers also offer coupons to customers. Although traditional coupon systems are considered effective in generating customer loyalty for the coupon clippers, they are largely underutilized as an information source for improving customer profiles. Improved customer profiles can lead to improved targeted advertising, yielding a more effective marketing tool, improving the ability to reach the right customers in a manner that they are willing to receive. Many prospective customers block unsolicited email and summarily discard what they consider to be junk mail. Retailers are therefore searching for ways to improve customer loyalty and targeting advertising programs though improved customer profiles.

SUMMARY

Shortcomings of the prior art are overcome, and additional advantages are provided, through the provision, in one aspect, of a method. The method can include, for example: adjusting a transmission parameter associated to a notification process for outputting a notification; determining a priority of users currently within an area of interest, the area of interest including an area of a venue; and outputting the notification to a subset of the users based on the adjusting and the determining.

In another aspect, a computer program product can be provided. The computer program product can include a computer readable storage medium readable by one or more processing unit and storing instructions for execution by one or more processor for performing a method. The method can include, for example: adjusting a transmission parameter associated to a notification process for outputting a notification; determining a priority of users currently within an area of interest, the area of interest including an area of a venue; and outputting the notification to a subset of the users based on the adjusting and the determining.

In a further aspect, a system can be provided. The system can include, for example a memory. In addition, the system can include one or more processor in communication with the memory. Further, the system can include program instructions executable by the one or more processor via the memory to perform a method. The method can include, for example: adjusting a transmission parameter associated to a notification process for outputting a notification; determining a priority of users currently within an area of interest, the area of interest including an area of a venue; and outputting the notification to a subset of the users based on the adjusting and the determining.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
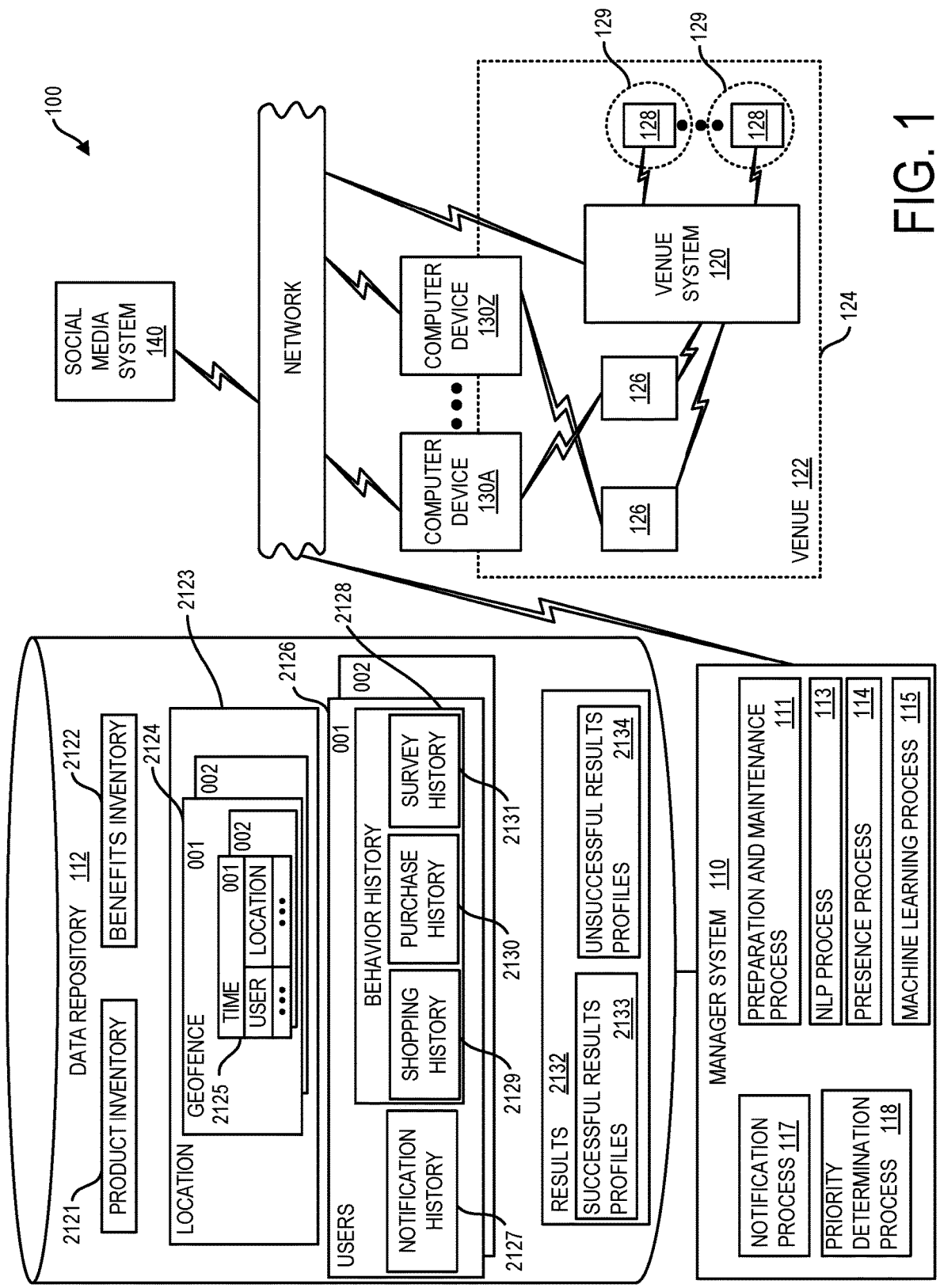
FIG. 1 depicts a system having manager system and a plurality of user computer devices in one embodiment.

System 100 for use in outputting notifications is illustrated in FIG. 1. System 100 in one embodiment can include manager system 110, venue system 120, plurality of user computer devices 130A-130Z, and social media system 140. Manager system 110 can have an associated data repository 112. Manager system 110, venue system 120, computer devices 130A-130Z and social media system 140 can be in communication with one another via network 150.

FIG. 1 is a block diagram of a system 100, in accordance with an embodiment as set forth herein. In the embodiment of FIG. 1, system 100 includes numerous devices, which may be or include computing nodes 10 as described herein, connected by a network 150. For example, network 150 may be a physical network and/or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

In one embodiment manager system 110 can be external to venue system 120 social media system 140 and to each of the one or more user computer device 130A-130Z. In one embodiment manager system 110 can be co-located with venue system 130 social media system 140 or another social media system. In one embodiment manager system 110 can be co-located with one or more user computer device 130A-130Z.

Referring further to FIG. 1, venue system 120 can be located in venue 122 that is delimited by geographical border 124 that specifies the geographical coordinate area occupied by venue 122. In one embodiment, an organizational entity that operates manager system 110 can be in common with the organizational entity that operates venue system 120 and venue 122. Venue 122 can be a retail venue in one embodiment.

Each of the different users of computer devices 130A-130Z can be associated to a different user. Regarding one or more user computer device 130A-130Z, a computer device of one or more user computer device 130A-130Z in one embodiment can be a computing node device provided by a client computer, e.g. a mobile device, e.g. a smartphone or tablet, a laptop or PC that runs one or more program including a web browser for browsing web pages.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system Embodiment herein recognize that a variety of a variety of problems arise in the realm of computer networks operating in a venue occupied by a plurality of users capable of communicating with the network. On the occurrence of events commonly experienced by multiple users at a common time, the multiple users may make concurrent demands on the network to overload the network and frustrate the function of relied on services. On outputting of notifications by the network to multiple users traffic patterns can be affected in significant ways giving rise to health risks, safety risks, and infrastructure building layout designed concerns.

Manager system 110 can run a preparation and maintenance process 111 to prepare and maintain data of data repository 112 for use by other processes run by manager system 110 such as notification process 117 and priority determination process 118.

Manager system 110 can run NLP process 113 to process data for preparation of records that are stored in data repository 112 and for other purposes manager system 110 can run a Natural Language Processing (NLP) process 113 for determining one or more NLP output parameter of a message. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message, perform natural language analysis, text analysis and/or computational linguistics to identify and extract subjective information in source messages. Topic analysis for topic classification and output of NLP output parameter can include topic segmentation to identify several topics within a message. Topic analysis can apply a variety of technologies e.g. one or more of hidden mark model (HMM), artificial chains, and passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (that is to say, the emotional state of the author when writing), or the intended emotional communication (that is to say, the emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness." In one embodiment, determining sentiment can include use of a scaling system whereby words commonly associated with having a negative, neutral or positive sentiment with them are given an associated number on a −10 to +10 scale (most negative up to most positive). Accordingly, it can be possible to adjust the sentiment of a given term relative to its environment (usually on the level of the sentence). When a piece of unstructured text is analyzed using natural language processing, each concept in the specified environment can be given a score based on the way sentiment words relate to the concept and its associated score. Accordingly, it can be possible to adjust the sentiment value of a concept relative to modifications that may surround it. Words, for example, that intensify, relax or negate the sentiment expressed by the concept can affect its score. Alternatively, text can be given a positive and negative sentiment strength score if the goal is to determine the sentiment in a text rather than the overall polarity and strength of the text. Performing sentiment analyses can include use of knowledge based techniques, statistical methods, and/or hybrid approaches. Knowledge-based techniques classify text by affect categories based on the presence of unambiguous affect words such as "happy", "sad", "afraid", and "bored". Some knowledge bases not only list obvious affect words, but also assign arbitrary words a probable "affinity" to particular emotions. Statistical methods can leverage elements from machine learning such as latent semantic analysis, support vector machines, "bag of words," semantic orientation, and pointwise mutual information. More sophisticated methods can detect the holder of a sentiment (i.e., the person who maintains that affective state) and the target (i.e., the entity about which the affect is felt). To mine the opinion in context and obtain the feature which has been opinionated, the grammatical relationships of words can be used. Grammatical dependency relations are obtained by deep parsing of the text. Hybrid approaches can leverage both machine learning and elements from knowledge representation such as ontologies and semantic networks in order to detect semantics that are expressed in a subtle manner, e.g., through the analysis of concepts that do not explicitly convey relevant information, but which are implicitly linked to other concepts that do explicitly convey relevant information.

Manager system 110 can run presence process 114 to determine identifiers of users and a count of users within an area of interest, such as an area including an area of venue 122 (e.g. an entirety of an area of a venue or a section of a venue). In one embodiment, manager system 110 running presence process 114 can determine location information for various users by employing local wireless area network location services, e.g., which locating services can employ processing of radio signals received by connecting nodes such as connecting nodes 126 as shown in FIG. 1. In one embodiment connecting nodes 126 can be provided by IEEE 802.11 access points. In one embodiment, manager system 110 running presence process 114 can determine location information for various users by examining beacon information. Venue system 120 in one embodiment can operate one or more beacons 128 that can be disposed at specific locations of a venue to emit radio signals from the specific locations. The beacon radio signals are typically short range so that receipt by a computer device 130A-130Z of a beacon radio signal of a particular beacon indicates that the computer device is in a particular bacon zone 129 (an area about a particular beacon.

Machine learning process 115 can be run to examine results provided by manager system 110 and to adjust processes performed by manager system 110 to increase accuracy of such processes and to reduce reliance of rules based criteria for decision making. Regarding machine learning process 115, machine learning process 115 can be run iteratively to examine run results provided by the running of other processes run by manager systems such as notification process 117 and priority determination process 118. Based on examining of results, manager system 110 in accordance with running of machine learning process 115 can adjust processes such as notification process 117 and priority determination process 118 based on result of examining so that accuracy of processes such as priority determination process 118 and notification process 117 increase overtime without reliance with low computational overhead and reduced reliance on rules based criteria Manager system 110 can run notification process 117 to output notifications to users. For running of notification process 117 manager system 110 can run an adjusting process for adjusting a transmission parameter, e.g., a notification output rate of notifications output by running of notification process 117. Manager system 110 can run notification process 117 to output notifications to users according to a priority determining by manager system 110 running priority determination process 118. Manager system 110 can run priority determination process 118 to determine a priority of users within an area of interest, e.g. within an area of geofence defined according to geographical border 124 of venue 122, within a geofence defined by a perimeter defined externally and spaced apart from border and encompassing an area of a venue 122 and an area outside of venue, or within a beacon zone 129 of a beacon 129. Notification process 117 can be run to determine transmission aspects of notifications to be output by manager system. For example, notifications of a product promotion for promoting a certain product offered by manager system. Notification process 117 can include an adjustment process for adjusting a transmission parameter associated with notification process, e.g., involving a rate of notification sent. Notification process 117 can be run to determine a number of notifications to be output over a certain time period. Notification process 117 can be run iteratively so that multiple notifications can be output, e.g., according to a notification process over time until notification process is terminated by a termination condition being satisfied. Prior to termination, one or more iteration of prioritization process 118 can be run to determine a priority of user's currently within an area of interest. Notifications sent or output by managers system 110 in accordance with notification process 117 can be output according to a priority that is determined by running a priority determination process 118.

Data repository 112 can store various data including in product inventory area 2121 product inventory data and in benefits inventory area 2122 benefits inventory respecting promotional benefits offered and redeemed by users. Data repository 112 can store in location area 2123 information on a plurality of geo-fences substantiated by manager system 110, e.g., geofence 001 geofence 002 and a plurality of additional geo-fences. Each geofence can specify the geographical location of a venue 122 specified by geography border 124. For each geofence of geofence area 2124, there can be stored in time records area 2125 time records. Each time record can specify users and their associated coordinates within the geo-fence at a specific time. Time records can be stored in geo-fence area 2124 of data repository 112 at a rate of several times per minute in one embodiment, e.g., 10 to 60 times a minute. Location area 2123 can also store records specifying users present and coordinate locations of users over time within beacon zones 129 about each of several beacons 128 of venue 122.

In user area 2126, there can be stored for each of a plurality of users, e.g., user 001, user 002, and a plurality of additional users data on users of manager system 110. User area 2126 for each user can include a notification history 2127 which can include records of notifications that have been sent to the user in accordance with the notification process as set forth herein. User area 2126 can also include behavioral history area 2128. In shopping history area 2129 of behavior history 2128, there can be stored a plurality of shopping history records. Each record specifying a prior shopping history activity of the user, e.g., web browsing history of the user can be stored in shopping history area. In area 2130, there can be stored records of purchase histories records of purchases by the user. Each record can specify information of a different purchase by the user. In survey area 2131, there can be stored records of surveys completed by the user. Shopping history data stored in area 2129 can include a record of a customer's shopping behavior e.g. data on whether the customer tends to shop online or in retail venues and the amount of times associated with online or in-store shopping. For example, in shopping history area 2129 there can be stored data records indicating the average time which a customer maintains an online browsing session and/or data that indicates the average length of time that a customer remains in a retail venue after arrival at a retail venue, and data records indicating cost and types of product browsed either on-line or in venue, and data records indicating breaches of beacon zones 129 of a venue 122. Topics for products purchased can be extracted and stored in area 2130. Data of purchase history area 2130 can include a record of purchase that the customer has made over time and include various sub-classifications relating e.g. to cost and types of products purchased. Topics for products purchased can be extracted and stored in area 2130. In area 2131 there can be stored survey history data e.g. can store records of surveys that have been completed in the past by the customer over time regarding preferences of the customer e.g. likes and dislikes.

Figure 2:
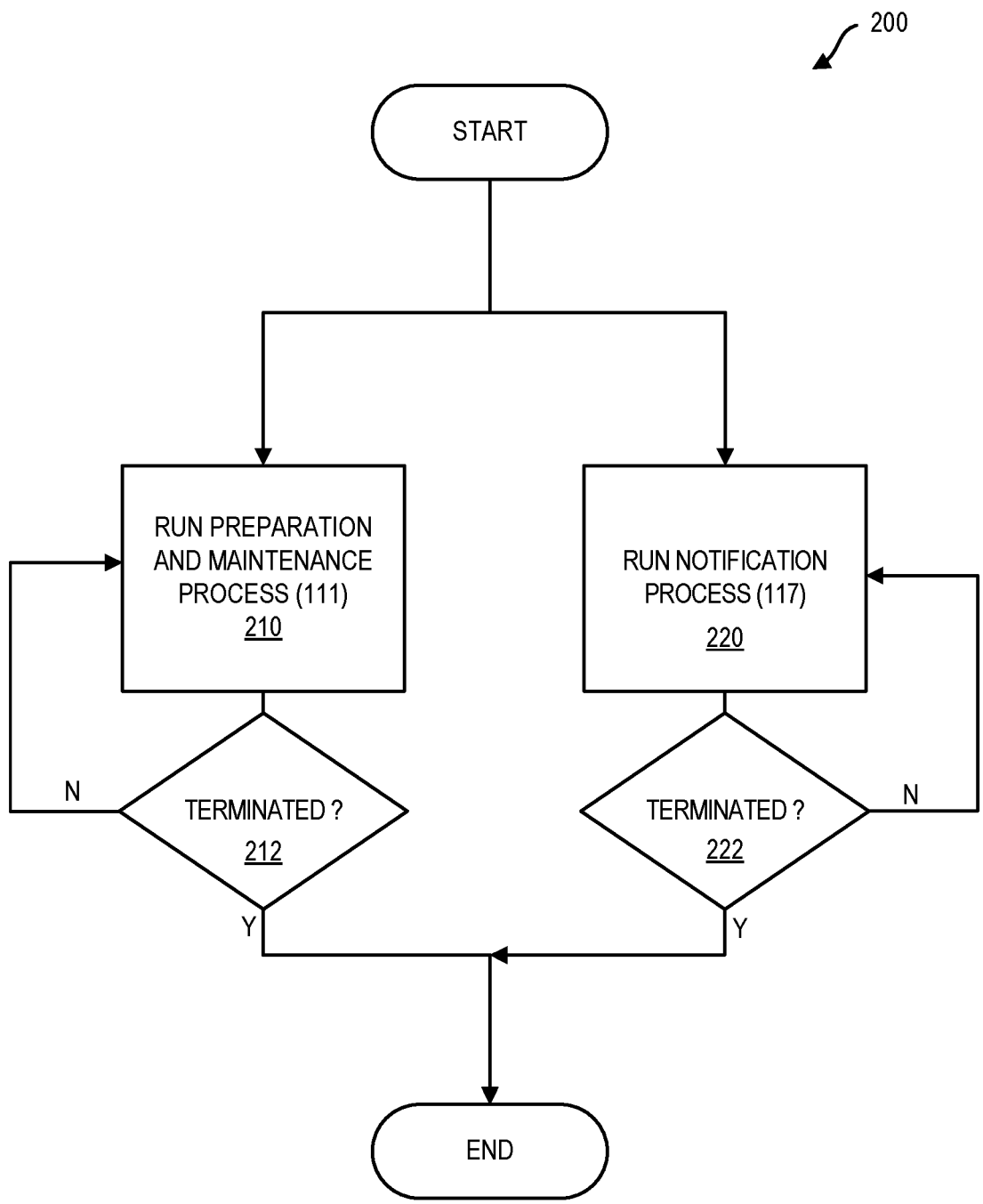
FIG. 2 is a flowchart depicting a method for use in providing notifications in one embodiment.

FIG. 2 depicts a flowchart of illustrating coordination of processes that can be performed by manager system 110 of FIG. 1, in accordance with one or more embodiments set forth herein.

At block 210, manager system 110 can run preparation and maintenance process 111 to populate prepare and maintain various data of data repository 112 including data of workload assistance history area 1122 shopping history area 2129 purchase history area 1124 and survey history area 2131. Manager system 110 can run preparation and maintenance process 111 until process 111 is terminated at block 212.

At block 220, manager system 110 can run notification process 117 to output one or more notification to one or more user. Manager system 110 can output notifications iteratively in the performance of a notification process, and manager system 110 can run more than one notification process concurrently. Manager system 110 can run notification process 117 until notification process 117 is terminated at block 222. Manager system 110 can run preparation and maintenance process 111 and notification process 117 concurrently and can run each of process 111 and process 117 iteratively.

For performance of preparation and maintenance process 111, manager system 110 can be configured to automatically process, e.g. by running of NLP process 113, messages that are generated by system 100. In one embodiment manager system 110 for performance of block 210 can instantiate structured data records in areas 1122-1125 that are adapted for use by notification process 117.

For instantiation of records into location area 2123 manager system 110 can monitor data messages output by location services of system 100 and/or beacons 128 to update location of users, e.g. within or external to venue specific geofences according to venue geographical borders 124 and/or locations within beacon zones 129.

For instantiation of records into product inventory area 2121 manager system 110 can request and receive messages from various data sources respecting inventory articles for purchase. Such messages can include e.g. descriptive content, e.g. product specification, user manual and instruction manual documents, from suppliers of inventory articles that can be registered into manager system 110. Such messages can also include e.g. descriptive content, e.g. product (purchase item) review postings from publicly accessible websites such as product review websites and social media websites. On receipt of messages specifying information of inventory articles for purchase manager system 110 can run NLP process 113 to determine one or more topic classifier for the inventory article.

For instantiation of records into benefits inventory area 2122 manager system 110 can request and receive messages e.g. from planning ledgers of venue managers who plan notification processes which can include e.g. sending of notifications of venue promotions in which there can be specified limits to a number of benefits that can be allocated per a particular promotion. Manager system 110 can be configured so that records of notifications output to users for a particular notification process, specifying e.g. users notified and message content can be stored in notification history area 2127.

For instantiation of records into user behavior history areas 2129, 2130, and 2131 manager system 110 can be configured so that manager system 110 automatically monitors for "activities" of a customer user and stores an activity record for each activity in one or more or area 2129, 2130, and 2131. An activity can be a shopping activity e.g. a browsing session on a venue website or an in venue visit. Records for such activities can be stored in area 2129. Activities can include purchases e.g. on line or in venue. Records for such activities can be stored in area 2130. Activities can include completed surveys which can completed on line. Records for such activities can be stored in area 2131. A record for an activity instantiated by manager system 110 can include e.g. a Customer ID, ID=001, and classification information return by subjecting a message generated by performance of the activity to NLP processing by running of NLP process 113, e.g. topic and/or sentiment classifications of generated messages. Data repository 112 can store such activity records in addition to or in place of underlying unstructured message content.

In one embodiment, data repository 112 can be configured to initialize responsively to being populated with a threshold amount of data having specified attributes.

Figure 3:
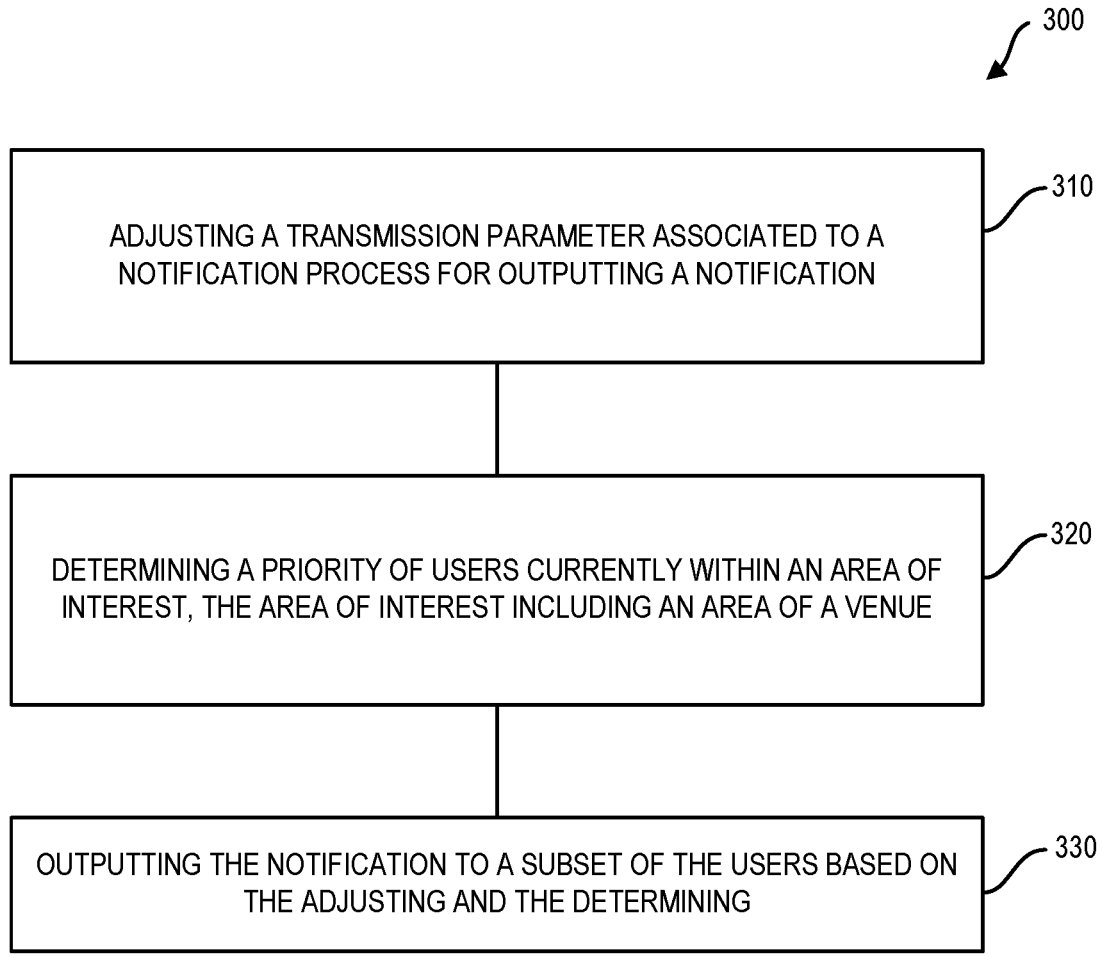
FIG. 3 is a flowchart depicting a method for use in providing notifications in one embodiment.

Manager system 110 can perform method 300 as set forth in FIG. 3. Manager system 110, at block 310 can perform adjusting a transmission parameter associated to a notification process for outputting a notification. Manager system 110 at block 320, can perform determining a priority of in-venue users currently within an area of interest. At block 330, manager system 110 can perform outputting the notification to a sub-set of the in-venue users based on the adjusting and the determining.

In one embodiment the notification process at block 310 can be a notification process for outputting a notification where the notification is a notification designed to induce a certain activity on the part of a user. In one embodiment, the certain activity can be the activity of the purchase of a certain product. In one embodiment a notification process can be a notification process to induce a user recipient of a notification to purchase a product. According to a notification process according to one embodiment notifications can be iteratively output until a termination condition is satisfied.

Adjusting at block 310 can include adjusting based on one or more factor, the one or more factor can include e.g. the factor e.g. a factor based on current inventory as specified by data of product inventory area 2121 of data repository 112. For example, manager system 110 can be operative so that as inventory of a product related to a notification decreases manager system 110 can decrease the rate of notification sending. According to another factor, adjusting at block 310 can include adjusting based on benefits inventory factor. For example, a notification specifies the coupon redemption, manager system 110 can adjust the transmission parameter e.g. a rate of notification based on remaining inventory of coupons located in a benefits inventory as specified by data of benefits inventory of data repository 112. Adjusting at block 310 can alternatively or in addition be based on the time of day factor. For example, manager system 110 can adjust a rate of notification transmission based on time of day e.g. so that fewer notifications are sent later in the day when users are less likely to be able to react to the notification.

For determining the priority of in venue users at block 320, manager system 110 can determine a probability of a user reacting in a targeted way based on a receipt of a notification. For example, a notification may be designed and authored to encourage a user to purchase a product. Accordingly a determining at block 320 can include a determining probability of a user purchasing a product based on and in response to a notification being received. Manager system 110, in one embodiment for performing determining at block 320 can employ Equation 1 as follows.

$$P=W1F1+W2F2+W3F3+W4F4+W5F5+W6 \quad \text{(Equation 1)}$$

Where "P" is the probability of the user reacting in a targeted way to receipt of a notification based on a plurality of factors where "F1" is the probability of a user reacting in a targeted way to receipt of a notification based on a user motion factor, where "F2" is the probability of a user reacting in a targeted way to receipt of a notification according to a calendar factor, where "F3" is the probability of a user reacting in a targeted way to receipt of a notification based on a shopping history factor, where "F4" is the probability of a user reacting in a targeted way to receipt of a notification based on a purchase history factor, and where "F5" is the probability of a user reacting in a targeted way to receipt of a notification according to a survey history factor and where "F6" is the probability of a user reacting in a targeted way to receipt of a notification according to a notification factor. In that factors F3-F5 relate to behavior history, factors F3-F5 can be regarded to be behavior history factors. For determining the priority of in venue users at block 320, manager system 110 can for each user of a set of candidate users apply Equation 1 to determine the probability of the user reacting in a targeted way to receipt of a notification and determine the priority based on the ranking of probability values. According to one use case where a notification process includes venue wide transmission of notifications the set of candidate users can be users currently within venue 122. According to one use case where a notification process includes selective beacon zone transmission of notifications the set of candidate users can be users currently within a certain one of beacon zones 129.

Manager system 110 can determine the factors "F1-F6" independently and can apply weights to the different factors to determine an overall probability of a user reacting in a targeted way to receipt of a notification. Accordingly, "W1" refers to a weight applied to factor "F1," "W2" refers to a weight applied to factor "F2," "W3" refers to a weight applied to factor "F3," "W4" refers to a weight applied to factor "F4," "W5" refers to a weight applied to factor "F5" and "W6" refers to a weight applied to factor "F6."

At block 330, manager system 110 can perform outputting the notification to a subset of users based on the adjusting and the determining. For example, manager system 110 can be configured in one embodiment so that at block 330 manager system 110 outputs three notifications. Accordingly manager system 110 at block 330 can output notifications to the users determined at block 320 to have the first, second, and third priority rankings, the priority rankings being based on the users' respective probability of reacting in a targeted way to receipt of the notification. In one embodiment, manager system 110 at block 330 can output a single notification. In such an embodiment, manager system 110 at block 330 can output a single notification to the single user determined at block 320 to have the highest probability of reacting a targeted way to receipt of a notification.

Figure 4:
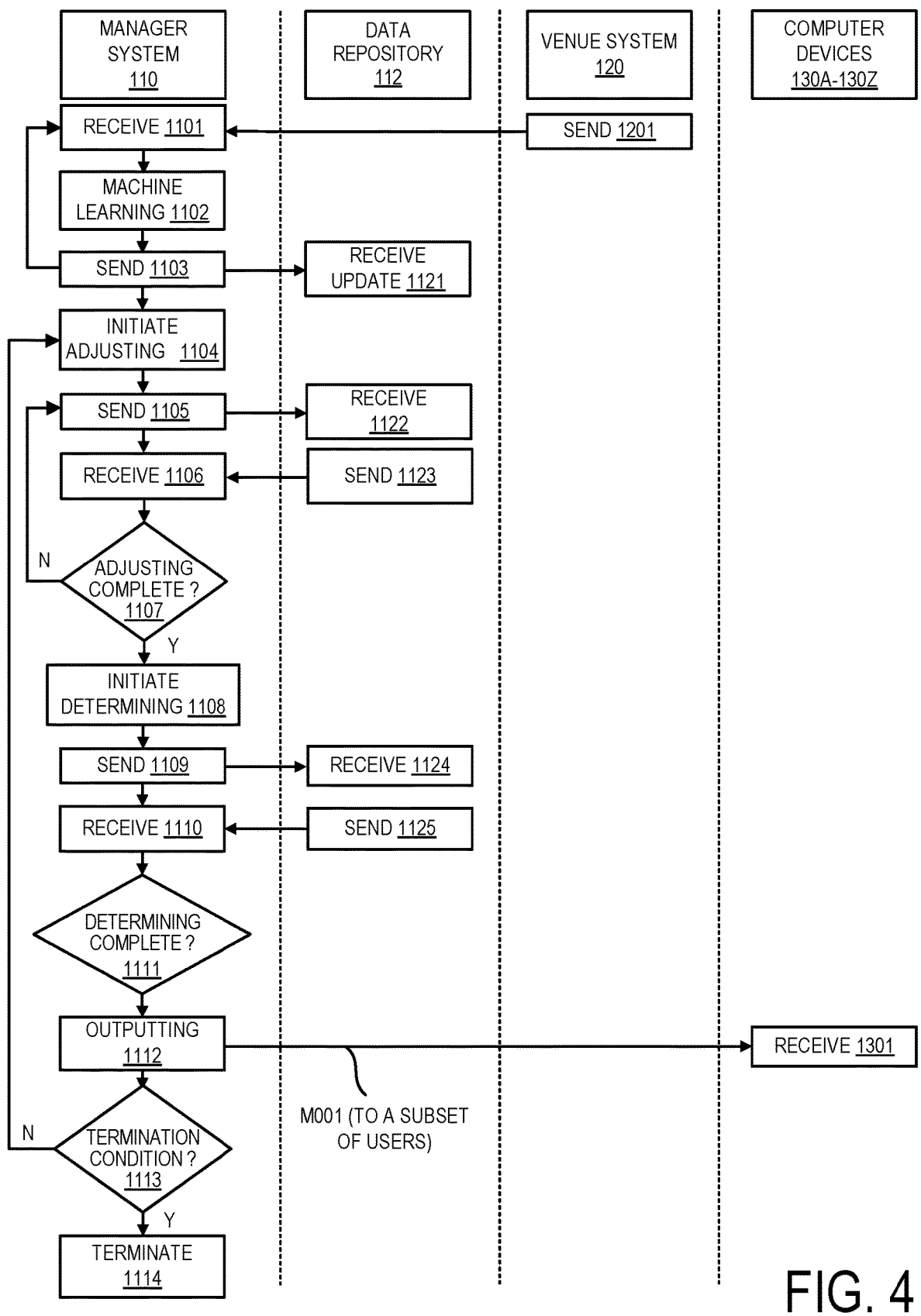
FIG. 4 is a flowchart depicting a method for use in providing notifications in one embodiment.
Figure 5:
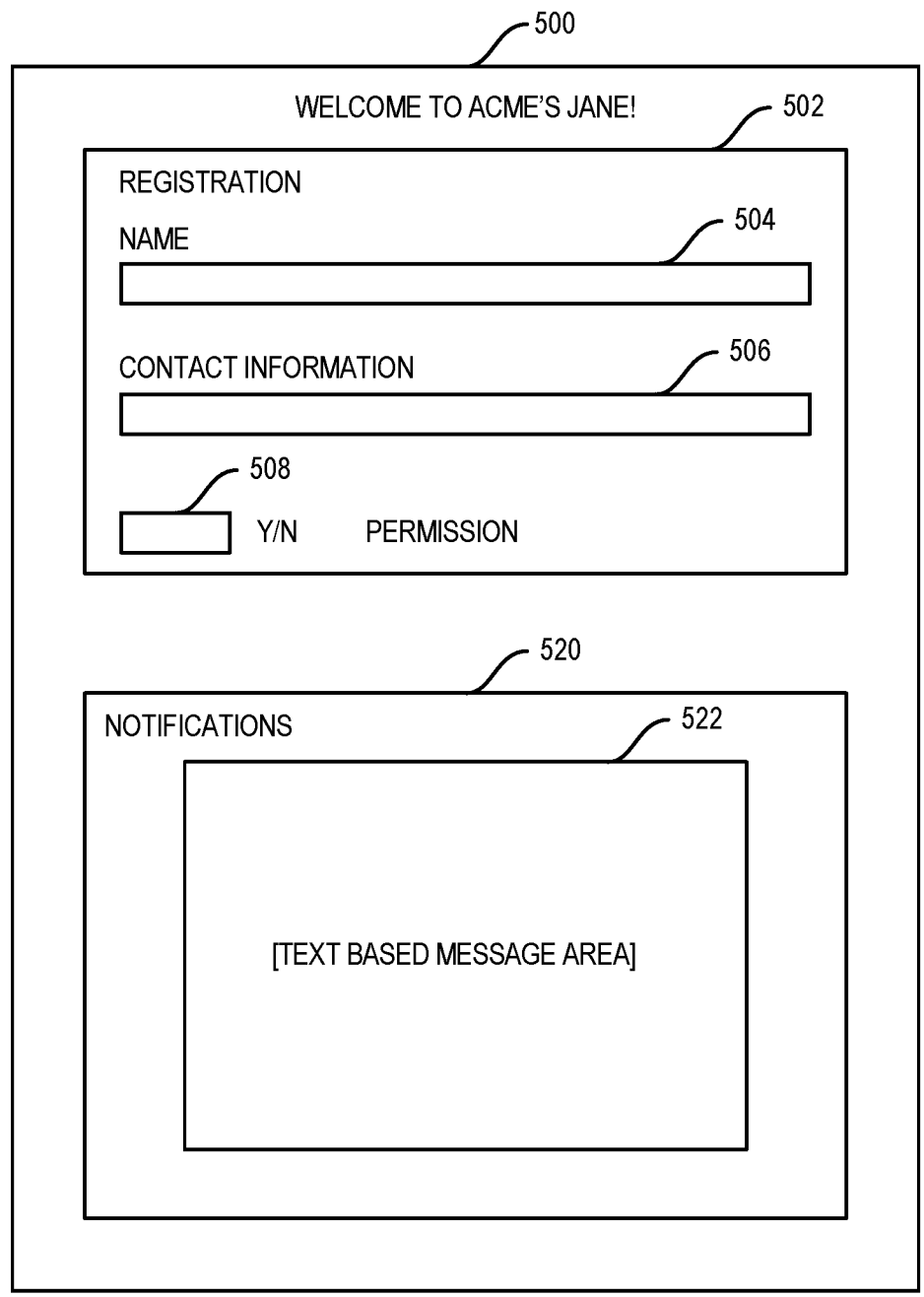
FIG. 5 is a user interface for use in a system for providing notifications in one embodiment.

In FIG. 4, there is set forth a specific example of method 300 as set forth in FIG. 3 being performed. In FIG. 4 a method is described as being performed from the perspective of manager system 110, data repository 112, venue system 120, and computer devices 130A-130Z.

At block 1201 venue system 120 can send location data and identification data to manager system 110 for receipt by manager system 110 at block 1101. Data sent at block 1201 can include identifiers and coordinate locations for users of manager system 110 currently within an area of interest, e.g. within an area of a geofence by geographical border 124 specifying the coordinate area occupied by venue 122, within an area of a geofence defined by a perimeter defined larger than and external to border 124, or within an area of a beacon zone 129 as set forth herein. Data representing geographical border 124, or a perimeter external to border 124 can be recorded in data repository 112 as a geofence. In one embodiment, location data sent to block 1201 can include location data determined using an IEEE 802.11 wireless local area network based locating service. Wireless locating services can provide reliable location data in a closed building environment. Location data sent at block 1201 can also include GPS based location data or cellular service location data, each of which can be sent by venue system 120 as indicated, user computer devices, and/or another network device. In one embodiment, location data sent to block 1201 can include beacon zone data, e.g. can include data indicating user identifiers within and associated to one or more beacon zone 129 of venue 122. Embodiments can feature automated user interface functionally wherein outputs can be triggered in response to sensed action by a user independent of any input into a manually operated user interface. For example, processing of radio signals can be performed to automatically sense a user's location and based on a sensed location of a user a notification can be output to the user. As set forth in reference to blocks 1101-1112 manager system 110 can output a notification to a user based on a location of the user (e.g. within a geofence representing a location of a venue or a beacon zone) and based on a determining that the user has a qualifying priority among other candidate users.

At block 1102 manager system 110 can perform machine learning processes to adjust one or more process performed by manager system 110 based on an examination of results data of manager system 110.

At block 1103, manager system 110 can send most recently received location data and user identifier data to data repository 112 for receipt by data repository 112 at block 1121. At block 1121 data repository 112 can update location area 2123 for a current geofence to include data for a new time period, can store in records area 2125 a record for the current time period that specifies e.g. a list of users within the geofence and coordinate locations of the users, the coordinate information can be correlated with each user for which a time record is stored in time record area 2125. At block 1121 data repository 112 can update location area 2123 to include lists users present at each beacon zone 129 of venue.

At block 1104, manager system 110 can initiate adjusting of a notification process which can be currently ongoing e.g. as part of an in-venue promotion. Concurrently, manager system 110 can return to block 1101. As indicated by the return from block 1103 to block 1101, manager system 110 can perform receive block 1101, machine learning block 1102, and send block 1103 concurrently with running a notification process and iteratively on an ongoing basis.

For performing adjusting of a notification process, manager system 110 can query various data of data repository 112. For example, manager system 110 can send a data query to data repository 112 at block 1105 for receipt by data repository 112 at block 1122, data repository 112 can send return data at block 1123 for receipt by manager system 110 at block 1106. Manager system 110 can perform adjusting by iteratively performing blocks 1105-1107 to receive and process received data from data repository 112. As set forth herein, manager system 110 can apply various factors for adjusting transmission parameter of a notification process such as, a rate of notification. According to a product inventory factor, manager system 110 can query data of product inventory area 2121 of data repository 112, according to a benefits factor manager system 110 for performing adjusting can query data from benefits area 2122 of data repository 112, and according to a time of day factor manager system 110 can for example, reduce a rate of notifications sent during time periods later in the day when such notifications may be less likely to be acted upon. The adjusting of a transmission parameter can be performed automatically by manager system 110 e.g. based on examination of data by manager system 110 of data within data repository 112, independently of any administrator user input entered into a manually operated user interface.

At block 1110, manager system 110 can initiate determining the priority of users currently within an area of interest. For performing such determining, manager system 110 can query data of data repository 112 and can employ a multi-factor probability function e.g. equation 1 as set forth herein. As part of performing determining, manager system 110 can send a data query at block 1109 for receipt by data repository 112 at block 1124. Data repository 112 can responsively send data at block 1125 for receipt by manager system 110 at block 1110. At block 1111 manager system 110 can determine whether current determining of priority between in-venue users has been complete. On determining that a determining process is complete, manager system 110 can proceed to block 1112 to perform outputting of one or more notifications. If a determining process is not complete, manager system 110 can return to block 1109 to further query data of data repository 112.

For performing determining at blocks 1108-1111 manager system 110 can employ Equation 1 having multiple factors, such as "F1" which can be a motion factor of a user, "F2" which can be a calendar factor, "F3-F5" which can be factors relating to user behavior, and "F6" which can be a prior notification factor. Regarding factor "F1" manager system 110 can examine location data of a user e.g. location data stored in time record area 2125 of geofence area 2124 of data repository 112. Manager system 110 can run a motion classifier to examine location data for a user over time to provide motion classifications that specify a pattern of motion for the user within an area of interest. Manager system 110 can assign higher probabilities of a user responding in a targeted manner to a notification through some classifications and can assign lower probabilities of a user responding to a notification in a targeted manner for other classifications. One classification can be e.g. the "in venue browsing" classification that indicates that a user is spending time browsing locations of a venue and is in no particular hurry to complete in venue browsing. Manager system 110 can assign such a classification with a high probability score indicating a likelihood for higher probability that a user will respond in a targeted manner to a notification. Another classification can be e.g. "exiting the venue" motion classification. According to such a profile, the motion of a user over time can indicate that the user is in a hurry and is endeavoring to exit a retail venue as soon as possible. Manager system 110 can assign such a classification with a lower probability score indicating less of a likelihood that the use will respond in a targeted manner in response to receipt of a notification. A determining at blocks 1108-1111 can include examining location data for a user over time within an area of interest to provide motion classifications that specify a pattern of motion for the user within an area of interest.

Figure 6:
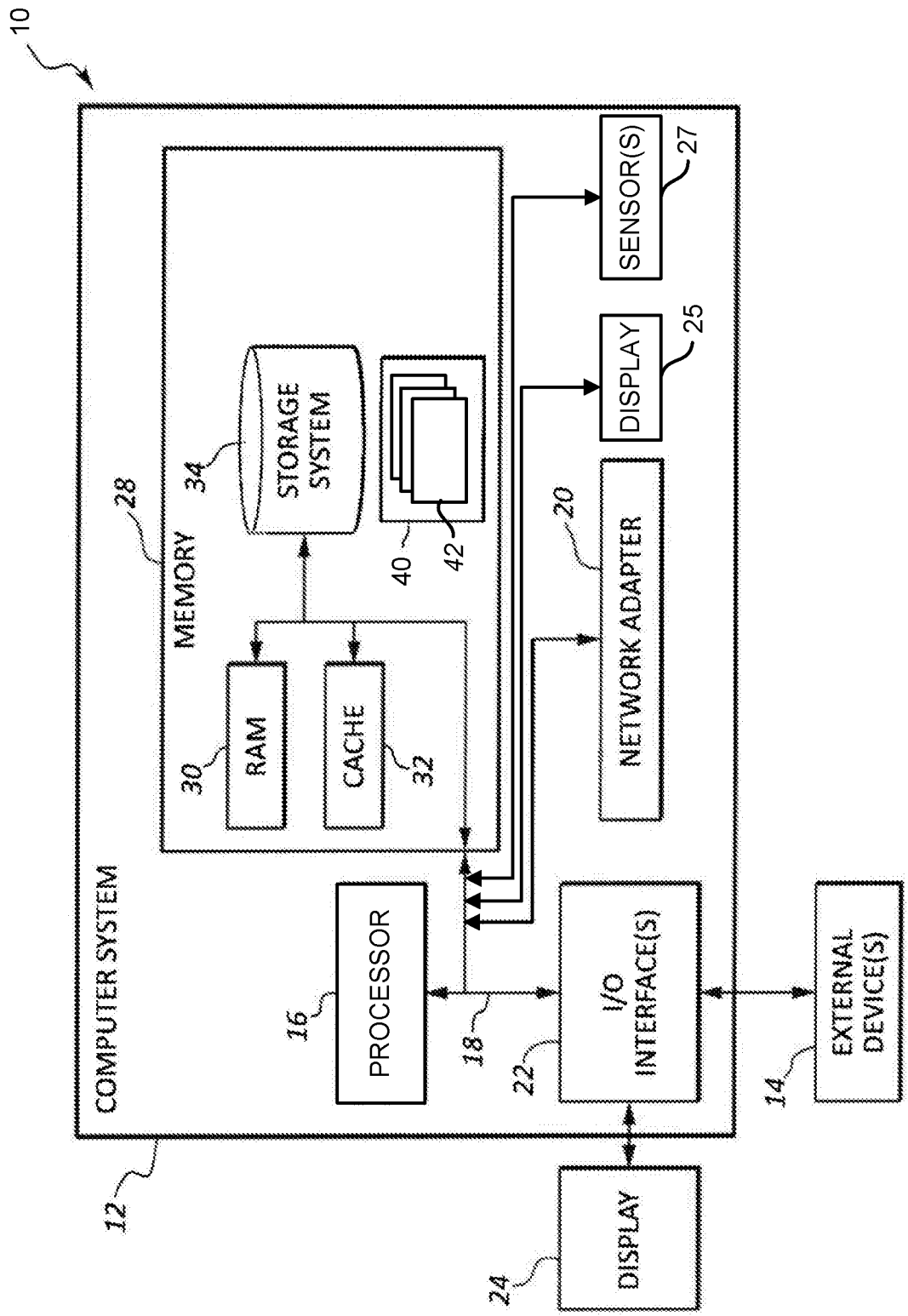
FIG. 6 depicts a computing node according to one embodiment.

System 100 can be configured in one embodiment so that when a user registers as a registered user of manager system 110 e.g. becomes customer loyalty card holder of manager system 110, the user can agree to upload contacts and calendar information of the user e.g. from a computer devices of the user to an area of users area 2126 of data repository 112. According to factor "F2" manager system 110 can examine calendar information of users area 2126 to determine if there are any events on the user's calendar that conflict with the targeted activity associated with the notification. If there are such conflicts, manager system 110 can assign a lower probability to the user for the notification indicating the lower probability that the user will respond in a targeted manner to the notification. A user interface 500 provided by a webpage served by a webpage server of manager system 110 is illustrated in FIG. 6. User interface 500 can be displayed on a display of computer device 130A-130Z. In registration area 502 of user interface 500 a user can enter in area 504 name information, in area 506 contact information (email, home address, phone, social media identifier), and in area 508 can grant permission to access a calendar of a user. In messaging area 520, user interface 500 can display notifications in area 522 e.g. in the form of a text based message to a user. Such notification can be provided e.g. by an in retail venue promotion, and in some cases can include e.g. a coupon for redemption.

For determining the factors "F3-F5" manager system 110 can examine instantiated records of behavior history area 2128 of data repository including instantiated records of shopping history area 2129, instantiated records of purchase history area 2130, and instantiated records of survey history area 2131. In one embodiment, manager system 110 can perform topic matching for determining probability factors "F3-F5." For example, in one embodiment, manager system 110 can activate NLP process 113 to process text data of a notification for sending. As a result of running NLP process 113, text data of the notification for sending can be classified by topic e.g. "coffee," "greeting cards," "dishware, "auto repair," as indicated in instantiated records of shopping history area 2129, purchase history area 2130, and survey history area 2131 can be records when populated into data repository 112 that have been subject to NLP processing and have topic classifiers associated therewith. Manager system 110 can perform topic matching by matching topics of a notification for sending to topics respectively of shopping history area 2129, records of purchase history 2130, and records of survey history area 2131. Manager system 110 can assign higher probabilities for each factor that a user will respond in a targeted manner with a higher percentage of records have topic classifications that match a topic classification of a notification and lower probability scores that a user will respond in a targeted manner to a notification where for lower percentage of records having topic classifications that match the topic classification of the notification for sending.

According to factor "F6" manager system 110 can examine records of notification history area 2127 of data repository 112 and can assign higher probability values where there is no prior notification according to the current notification sent in the past or where notifications were sent in the past but only a distant time in the past e.g. more than a threshold period of time such as ten minutes, twenty minutes, thirty minutes, and the like. Manager system 110, according to factor "F6" can assign lower probabilities that a user will respond in a targeted manner in the case a notification was just recently sent according to the current notification e.g. within the last five minutes, one minute, ten minutes. Regarding factor "F6" manager system 110 can examine the notification history of a user to determine whether a notification according to the current notification has previously been sent. Manager system 110 can be configured so that if the "would be" notification is a repeat of a recently sent notification manager system 110 can assign a low level of probability to the factor that the repeated notification will induce a targeted action on the part of a recipient. Factor "F6" can be established so that the factor loses its effect over time i.e. so that the probability of an action being induced on the part of a recipient is not assigned a low value unless the prior notification according to the current notification is very recently sent e.g. within the last minute, five minutes, ten minutes and the like. However, the factor is assigned so that the probability of an action being induced is not driven to a low value if the prior notification according to the current notification was sent within a substantial time period from the current time e.g. more than ten minutes, more than twenty minutes, more than thirty minutes, and the like. For determining the priority of users at block 320, manager system 110 can for each user of a set of candidate users apply Equation 1 to determine the probability of the user reacting in a targeted way to receipt of a notification and determine the priority based on the ranking of probability values. According to one use case where a notification process includes venue wide transmission of notifications the set of candidate users can be users currently within venue 122. According to one use case where a notification process includes selective beacon zone transmission of notifications the set of candidate users can be users currently within a certain one of beacon zones 129. According to one use case where a notification process includes venue wide transmission of notifications the set of candidate users can be users currently within an area larger than and encompassing venue 122 (e.g. between about 10 percent and about 20 percent larger than, between about 10 percent and about 20 percent larger than, between about 20 percent and about 100 percent larger than, between about 100 percent and about 500 percent larger than).

In one embodiment, determining a prioritization of users as set forth at blocks 1107-1111 can include adjusting prioritization of users determined according to an application of Equation 1, which Equation 1 can be applied to determine a prioritization based on a probability of users reacting in a targeted way to receipt of a notification. For example, manager system 110 can shift a priority of a user downward on a priority list based on a determining that a user is a prolific shopper e.g. and is therefore likely to be available to receive a subsequent iteration of a transmitted notification transmitted iteratively to various users according to a notification process. For determining that a user is a prolific shopper manager system 110 in one embodiment can examine data of shopping history area 2129 of users area 2126 of data repository 112 which can include records indicating such information e.g. average length of store visits and average number of breaches per venue visit to respective beacon zones 129 (FIG. 1) of a venue 122.

At block 1112, manager system 110 can perform outputting of notifications, notifications can be output via alternative means. For example, the user can be logged in to an in-venue application made available by an operator of manager system 110 and venue 122 and manager system 110 can update webpages for viewing. By becoming a registered user of manager system 110, a user can have agreed to allow manager system 110 to post content to a user's social media account, accordingly notifications can be output to social media system 140 or another system having a messaging system facilitating display of a notification on a user computer device such as a Short Message Service (SMS) based messaging system or e-mail system. Outputting at block 1112 can include outputting to only a subset of users currently in an area of interest. A currently activated notification process in one embodiment can be configured to include sending notifications N notifications at a time e.g. one notification at a time, two notifications at a time, five notifications at a time. At block 1112, manager system 110 can perform outputting of the N notifications according to prioritization of users currently in the venue as determined by the determining process as performed at blocks 1108-1111. Thus, notifications can be output at block 1112 to users determined by the determining process to be the users having the highest probability of responding in a targeted manner to a notification.

In one embodiment, a notification process as set forth herein can be a notification process to output notifications on a per venue basis, e.g. determining at block 1108-1108 and corresponding to block 320 can include determining a priority as between all users in an area of interest, and outputting at block 1112 and corresponding to block 330 can include outputting to users who may be dispersed at any location within an area of interest. In one embodiment, a notification process as set forth herein can be a notification process to output notifications on a per beacon zone basis, e.g. determining at block 1108-1108 and corresponding to block 320 can include determining a priority as between all users in an area of interest who are currently within a certain beacon zone (FIG. 1), and outputting at block 1112 and corresponding to block 330 can include outputting to users who are users currently within the beacon zone 129.

At block 1113, manager system 110 can determine whether a termination condition is satisfied. A termination condition can arise under a number of scenarios, for example, one factor for adjusting a transmission parameter of a current notification process can be the factor time of day. In one embodiment, the time of day factor can be weighted so as to drive termination of a notification sending process at a predetermined time close to the end of the day. In another embodiment, data of product inventory area 2121 of data repository 112 can drive termination, for example, if the inventory data indicates that a product that is the subject of the notification for promotion of the product is zero, a notification process can be terminated. Data from benefits inventory area 2122 of data repository 112 can also drive termination of a notification process, for example if a supply of promotion benefits is exhausted.

Referring again to block 1102, manager system 110 can perform processes of machine learning process 114. In one embodiment, manager system 110 in accordance with machine learning block 1102 can examine data such as purchase history data from purchase history area 2130 of each user determined to have just (e.g. during the current iteration) exited a venue in connection with notification history 2127 of that user from notification history area 2127. By examining recent history data from notification history 2127 in connection with purchase history area 2130 manager system 110 can determine whether a notification output to a certain user in accordance with a notification process was successful in inducing a purchase by the user. The examining of a purchase of the user can include an examining to determine whether a product referenced in a notification output to the user at a prior iteration of block 1112 was purchased or can be more general and include an examining of whether a product of the classification of the product referenced in a notification was purchased or any product was purchased. Such product purchases in one embodiment can be determined to be results in accordance with the targeted result of a notification. Manager system 110, at block 1102 by examining data of users determined to have exited a venue 122 can also determine whether a notification was unsuccessful via an examination of data of notification history area 2127 in connection with data of purchase history area 2130 occurring during the venue visit just terminated by the user. Where no purchase occurred, manager system 110 in one embodiment can determine that a prior notification referenced in notification history area 2127 was unsuccessful.

Referring again to Equation 1 manager system 110 can store weight profiles e.g. the set of weight values "W1-W6" yielding successful results in a successful results profiles area 2133 of data repository 112 and can store weight profiles yielding unsuccessful results in an unsuccessful results profiles area 2134 of data repository 112. During each iteration of manager system 110 using Equation 1, manager system 110 can adjust the values of the weights of "W1-W6" based on updated weight profiles information stored in successful results profiles area 2133 and the unsuccessful results profiles area 2134 of data repository 112. Manager system 110 can bias weights of Equation 1 during each iteration in favor of weights (e.g. having a threshold similarity level according to a similarity criteria) producing successful results and away from weights (e.g. having a threshold dissimilarity level according to a dissimilarity criteria) producing unsuccessful results. In such manner, an accuracy of probability determination is performed by manager system 110 can increase over time based on examining of data by manager system 110 on an automatic basis i.e. independent of user input data input via a manually operated user interface. Use of machine learning processes as set forth in reference to block 1102 can enhance accuracy while reducing reliance on rules based criteria for decision making and thus can provide for reductions in computational overhead. During performance of iterations of prioritization determinations using Equation 1 manager system 110 can vary weights W1-W6 within valid ranges in a manner so that the weights are not predetermined but rather are subject to optimization through machine learning processes as set forth herein.

Certain embodiments herein may offer various technical computing advantages, involving computing advantages to address problems arising in the realm of computer networks and particularly computer networks operating in a venue occupied by a plurality of users capable of communicating with the network. In one aspect, on the occurrence of events commonly experienced by multiple users at a common time, the multiple users may make concurrent demands on the network to overload the network and frustrate the function of relied on services. In accordance with that aspect embodiments herein can intelligently reduce potential network loading events by intelligent management of notifications to users. Embodiments herein can also address traffic flow concerns for example by reducing a risk that users will collide or bottleneck within certain areas of venue on receipt of a notification. By intelligent outputting of notifications embodiments herein can impact venue traffic patterns in positive ways by reduction of health risks, safety risk, and by increasing traffic flow support under the constraint of a certain infrastructure venue layout design. Embodiments herein can dynamically adjust or "throttle" notifications output to users to reduce network overloading risk while at the same time addressing concerns of in venue traffic congestion. Embodiments herein further can feature automated user interface functionally wherein outputs can be automatically triggered in response to sensed action by a user independent of any input into a manually operated user interface. For example, processing of radio signals can be performed to automatically sense a user's location and based on a sensed location of a user a notification can be output to the user. Certain embodiments herein may offer various technical computing advantages, involving computing advantages to address problems arising in the realm of computer networks such as involving computer network to user interfacing wherein inaccurate information or misalignment with a user's attention state can yield user disengagement and wasted and unnecessary computing resource expenditures. Embodiments herein recognize that interactions between a computer network and a user of the computer network are fundamental to the operation of the computer network. For example if information presented to a user is inaccurate or misaligned to a user's state of attention, the user can disengage from the network leading to a range of problems. Computing resources will be allocated to providing functions not utilized to deliriously effect efficiencies of other services provided. Computing resources may be unnecessarily allocated to facilitate an unnecessary session termination process and additional computing resources to facilitate an unnecessary re-login process and an unnecessary re-authentication process. Embodiments herein recognize that a user interfacing with a computer network can be expected to disengage if presented with information that is inaccurate or misaligned to a current state of attention of a user. Machine learning processes can be performed for increased accuracy and for reduction of reliance on rules based criteria and thus reduced computational overhead. In one embodiment, a data repository can be leveraged which can be populated and managed by multiple processes including proactive data populating process invoking automated search engines searching of multiple data sources. For enhancement of computational accuracies, embodiments can feature computational platforms existing only in the realm of computer networks such as artificial intelligence platforms, and machine learning platforms. Embodiments herein can employ data structuring processes, e.g. employing Natural Language Processing (NLP) for transforming unstructured data into a form optimized for computerized processing. Embodiments herein can provide results and advantages that are not possible or practical without use of components of a technical computing environment, such as processes leveraging instantaneous queries of a data repository storing user behavior history data to develop multifactor probability determinations. Embodiments herein can examine data from diverse data sources such as data sources that process radio signals for location determination of users. Embodiments herein according to one artificial intelligence platform can, in order to drive cognitive decision making, examine location data and classify motion data of a user into one of a plurality of candidate motion behavior categories. Embodiments herein can include artificial intelligence processing platforms featuring improved processes to transform unstructured data into structured form permitting computer based analytics and predictive decision making. Embodiments herein can include particular arrangements for both collecting rich data into a data repository and additional particular arrangements for updating such data and for use of that data to drive artificial intelligence decision making.

Figure 7:
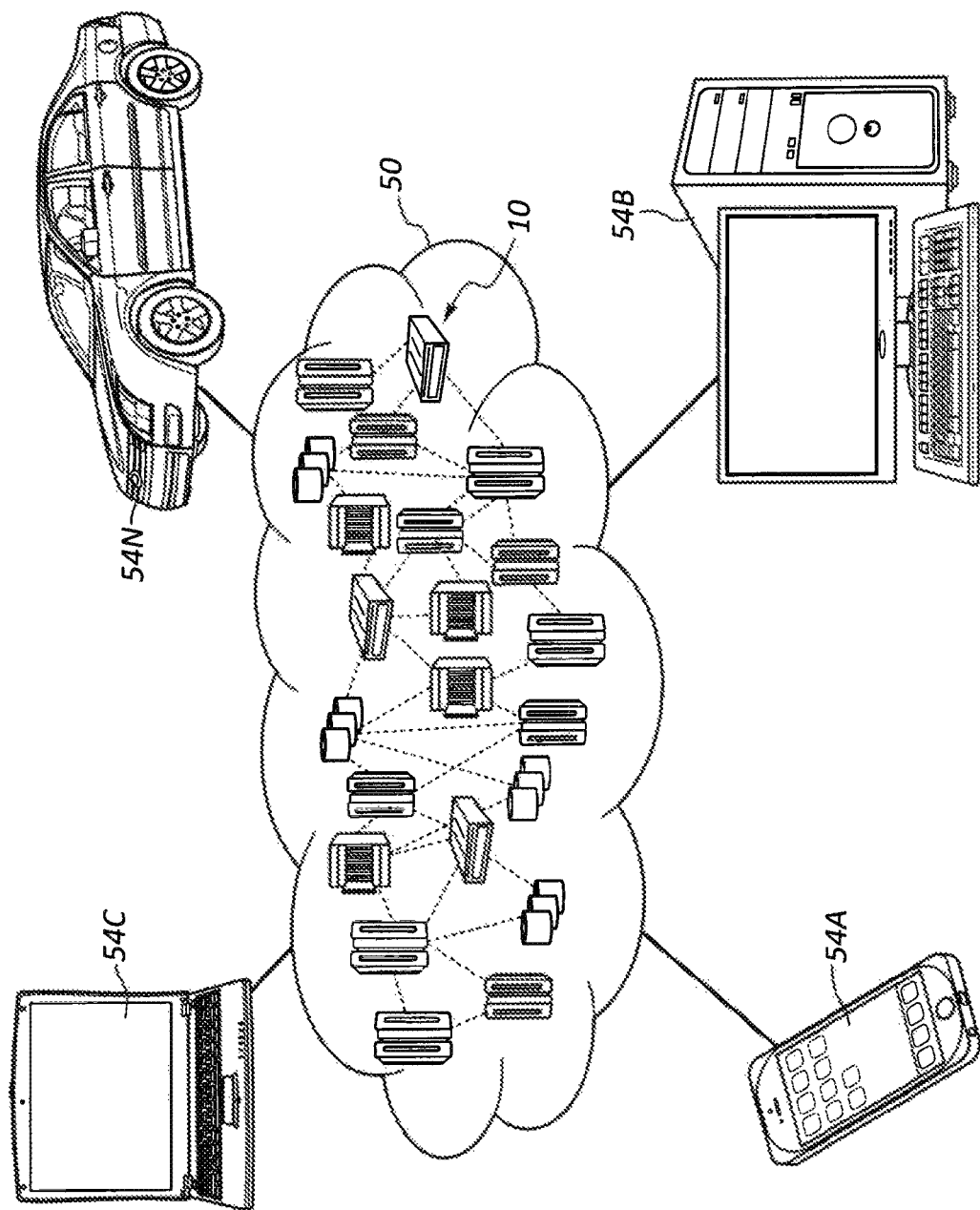
FIG. 7 depicts a cloud computing environment according to one embodiment.
Figure 8:
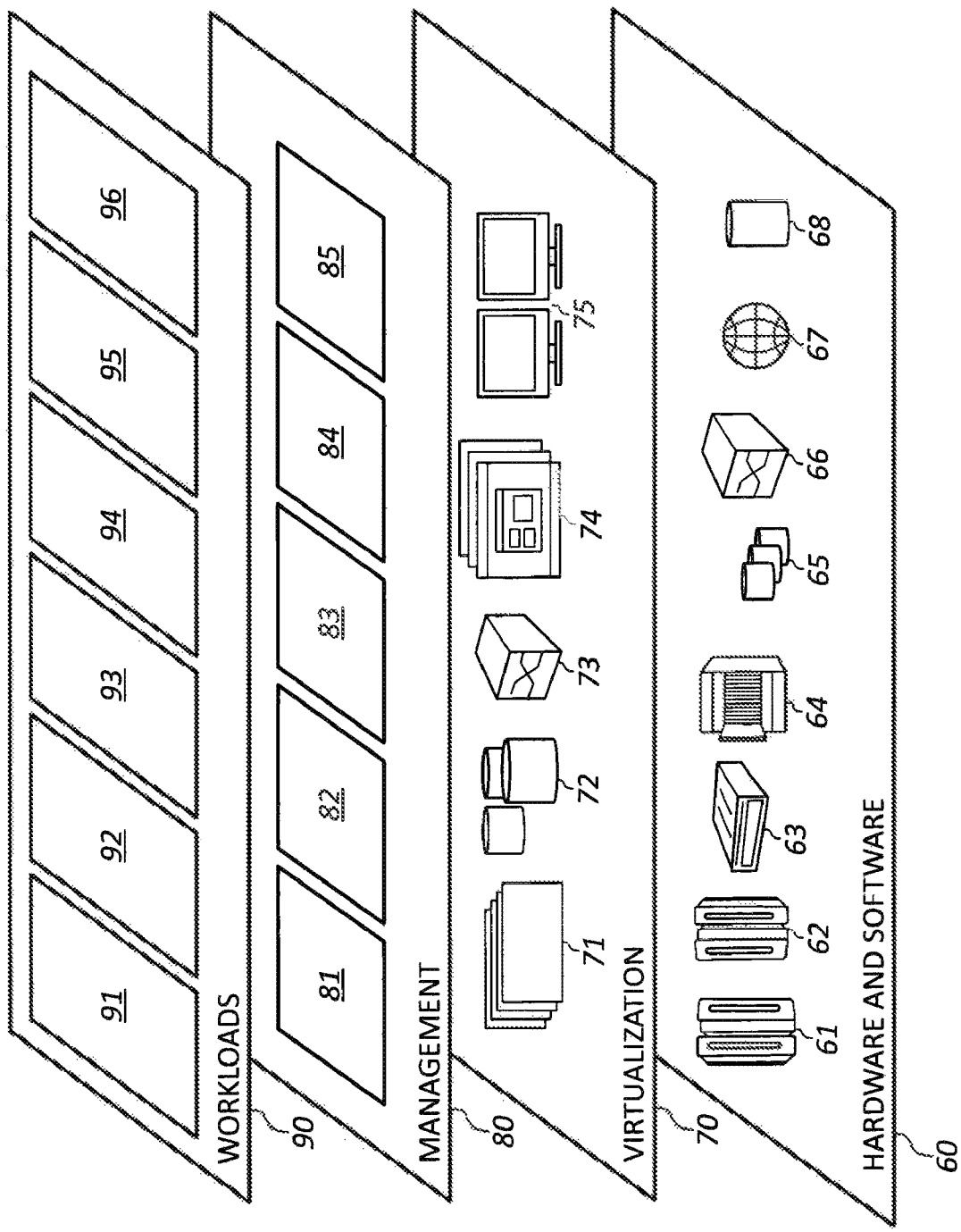
FIG. 8 depicts abstraction model layers according to one embodiment.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 7-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of the flowchart of FIG. 2, and the functions described with reference to method 300 of the flowchart of FIG. 3. and the functions described with reference to manager system 110 as set forth in the flowchart of FIG. 4. In one embodiment, venue system 120 can include one or more computing node 10 and can include one or more program 40 for performing functions described with reference to social media system 140 as set forth in the flowchart of FIG. 4. In one embodiment, one or more user computer device 130A-130Z can include one or more computing node 10 and can include one or more program 40 for performing functions described with reference to one or more user computer device 130A-130Z as set forth in the flowchart of FIG. 4.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 7 computing node 10 is described as being implemented in a cloud computing environment and accordingly is referred to as a cloud computing node in the context of FIG. 7.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for running a notification process herein. The processing components 96 can be implemented with use of one or more program 40 described in FIG. 6.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:

adjusting a transmission parameter associated to a notification process for outputting a notification, wherein the notification specifies an article, wherein the adjusting is based on each of a product inventory factor involving examining a remaining inventory of an article specified by the notification, a benefits inventory factor involving examining of remaining benefits available for redemption and a time of day factor that indicates a remaining time of operation of a venue for a current day, wherein the examining remaining inventory of the article includes querying inventory data of a data repository to determining a remaining amount of the article specified in in the notification, and wherein the adjusting includes reducing a rate at which the notification specifying the article is transmitted in dependence on (a) a determination by the examining the remaining inventory of the article that an available inventory of the article has decreased, (b) a determination by the examining the remaining benefits that remaining benefits available for redemption has decreased, and (c) the remaining time of operation for the current day has decreased;

determining a priority of users currently within an area of interest, the area of interest including an area of the venue, wherein the determining a priority of users currently within an area of interest includes identifying by examination of user location data users currently within the venue, and scoring a probability of the respective identified users reacting in a targeted way to the notification, wherein the scoring a probability is based on each of a motion factor involving examining a pattern of motion of the respective identified users currently within the venue and a behavior history factor involving examining a behavior history of the respective identified users currently within the venue, wherein the determining a priority of users currently within the area of interest includes providing an ordered ranking of the respective identified users currently within the venue according to a result of performing the scoring a probability of the respective identified users reacting in a targeted way to the notification; and outputting the notification to a subset of the users, as determined by the ordered ranking, based on the adjusting and the determining, wherein the notification is a text based notification respecting a product, wherein the determining the priority of users currently within an area of interest is based on a behavior history factor involving examining a web browsing behavior history of a user of the users, and wherein the examining includes matching a topic of the text based notification to a topic of web browsing behavior history data records of the user stored in a data repository, wherein determining a topic of the text based notification includes subjecting text based data of the text based notification to natural language processing to extract a topic classification of the text based data of the text based notification, and wherein determining a topic of the web browsing behavior history records of the user includes subjecting text based data of the web browsing behavior history records to extract a topic classification for the behavior history records.

2. The method of claim 1, wherein the determining is based on a motion factor involving running a motion classifier to examine location data of the user over time within the venue for providing a motion classification that specifies a pattern of motion for the user within the venue, wherein the method includes running the motion classifier to classify a first user according to an "in venue browsing" motion classification, and running the motion classifier to classify a second user according to an "in venue browsing" motion classification, wherein the method further includes assigning for the motion factor to the first user a relatively higher probability of reacting in a targeted way to receipt of the notification, and assigning for the motion factor to the second user a relatively higher probability of reacting in a targeted way to receipt of the notification.

3. The method of claim 1, the determining is based on an examining of shopper history data of a data repository that indicates an expected period of a user's presence within the venue.

4. The method of claim 1, wherein the method includes iteratively repeating the adjusting, the determining, and the outputting until a termination condition is satisfied to terminate the notification process.

5. The method of claim 1, wherein the determining the priority of users currently within the area of interest includes determining a priority of users currently within a beacon zone of the venue, and wherein the outputting the notification to a subset of the users includes outputting the notification to a subset of the users within the beacon zone.

6. The method of claim 1, wherein the determining the priority of users currently within an the area of interest includes for each user of a set of candidate users determining a probability that the user will react in a targeted way to receipt of a notification, and determining the priority based on a ranking of probability values of that candidate users.

7. The method of claim 1, wherein the method includes performing a machine learning process to perform examining of results provided by the determining and adjusting the determining based on the examining.

8. The method of claim 1, wherein the determining includes applying a function that combined weighted factors, and wherein the method includes performing a machine learning process to perform examining of results providing by the determining and adjusting the determining based on the examining, the adjusting including adjusting weights of the weighted factors.

9. The method of claim 1, wherein the determining a priority of users currently within the area of interest includes for each user of a set of candidate users determining a probability that the user will react in a targeted way to receipt of a notification, and determining the priority based on a ranking of probability values of that candidate users, wherein the determining a probability includes applying the function $P=W1F1+W2F2+W3F3+W4F4+W5F5+W6F6$, wherein F1 is a motion factor involving examining a pattern of motion of the user within the venue, F2 is a calendar factor involving examination of conflicting calendar commitments of the user, F3 is a shopping history factor involving examining a shopping history pattern of the user, F4 is a purchase history factor involving examining a purchase history of the user, F5 is a survey history factor involving examining of a survey history of the user, and F6 is a notification history factor involving examining a history of prior notifications to the user, and wherein W1-W6 are respective weights of the factors F1-F6.

10. The method of claim 1, wherein the determining a priority of users currently within the area of interest includes for each user of a set of candidate users determining a probability that the user will react in a targeted way to receipt of a notification, and determining the priority based on a ranking of probability values of that candidate users, wherein the determining a probability includes applying the function $P=W1F1+W2F2+W3F3+W4F4+W5F5+W6F6$, wherein F1 is a motion factor involving examining a pattern of motion of the user within the venue, F2 is a calendar factor involving examination of conflicting calendar commitments of the user, F3 is a shopping history factor involving examining a shopping history pattern of the user, F4 is a purchase history factor involving examining a purchase history of the user, F5 is a survey history factor involving examining of a survey history of the user, and F6 is a notification history factor involving examining a history of prior notifications to the user, and wherein W1-W6 are respective weights of the factors F1-F6, wherein the method includes performing a machine learning process to perform examining of results provided by the determining to store weight profiles specifying values of the weights W1-W6 yielding successful results in a successful results area of a data repository and to store weight profiles specifying values of the weights W1-W6 yielding unsuccessful results in an unsuccessful results area of a data repository, and adjusting the determining based on the examining, the adjusting including biasing weights W1-W6 for use in the performing of the determining in favor of weight profiles of the successful results area and away from weight profiles of the unsuccessful results area.

11. A computer program product comprising:
    a computer readable storage medium readable by one or more processing unit and storing instructions for execution by one or more processor for performing a method comprising:
        adjusting a transmission parameter associated to a notification process for outputting a notification, wherein the notification specifies an article, wherein the adjusting is based on each of a product inventory factor involving examining a remaining inventory of an article specified by the notification, a benefits inventory factor involving examining of remaining benefits available for redemption and a time of day factor that indicates a remaining time of operation of a venue for a current day, wherein the examining remaining inventory of the article includes querying inventory data of a data repository to determining a remaining amount of the article specified in in the notification, and wherein the adjusting includes reducing a rate at which the notification specifying the article is transmitted in dependence on (a) a determination by the examining the remaining inventory of the article that an available inventory of the article has decreased, (b) a determination by the examining the remaining benefits that remaining benefits available for redemption has decreased, and (c) the remaining time of operation for the current day has decreased;

determining a priority of users currently within an area of interest, the area of interest including an area of the venue, wherein the determining a priority of users currently within an area of interest includes identifying by examination of user location data users currently within the venue, and scoring a probability of the respective identified users reacting in a targeted way to the notification, wherein the scoring a probability is based on each of a motion factor involving examining a pattern of motion of the respective identified users currently within the venue and a behavior history factor involving examining a behavior history of the respective identified users currently within the venue, wherein the determining a priority of users currently within the area of interest includes providing an ordered ranking of the respective identified users currently within the venue according to a result of performing the scoring a probability of the respective identified users reacting in a targeted way to the notification; and outputting the notification to a subset of the users, as determined by the ordered ranking, based on the adjusting and the determining, wherein the notification is a text based notification respecting a product, wherein the determining the priority of users currently within an area of interest is based on a behavior history factor involving examining a web browsing behavior history of a user of the users, and wherein the examining includes matching a topic of the text based notification to a topic of web browsing behavior history data records of the user stored in a data repository, wherein determining a topic of the text based notification includes subjecting text based data of the text based notification to natural language processing to extract a topic classification of the text based data of the text based notification, and wherein determining a topic of the web browsing behavior history records of the user includes subjecting text based data of the web browsing behavior history records to extract a topic classification for the behavior history records.

12. The computer program product of claim 11, wherein the notification specifies a product within a venue available for user acquisition within the venue, wherein the adjusting is based on each of a product inventory factor involving examining a remaining inventory of the product specified by the notification, a benefits inventory factor involving examining of remaining benefits available for redemption and a time of day factor that indicates a remaining time of operation of the venue for a current day, wherein the examining remaining inventory of the product includes querying inventory data of a data repository to determine a remaining amount of the product specified in the notification available for acquisition within the venue, and wherein the adjusting includes reducing a rate at which the notification specifying the product is transmitted in dependence on (a) a determination by the examining the remaining inventory of the product that an available inventory of the product available for user acquisition has decreased, (b) a determination by the examining the remaining benefits that remaining benefits available for redemption has decreased, and (c) the remaining time of operation of the venue for the current day has decreased;

wherein motion data that specifies the pattern of motion of the respective identified users currently within the venue includes motion data that specifies that second users of the respective identified users are exiting the venue.

13. The computer program product of claim 11, wherein the determining is based on a motion factor involving running a motion classifier to examine location data of the user over time within the venue for providing a motion classification that specifies a pattern of motion for the user within the venue, wherein the method includes running the motion classifier to classify a first user according to an "in venue browsing" motion classification, and running the motion classifier to classify a second user according to an "in venue browsing" motion classification, wherein the method further includes assigning for the motion factor to the first user a relatively higher probability of reacting in a targeted way to receipt of the notification, and assigning for the motion factor to the second user a relatively higher probability of reacting in a targeted way to receipt of the notification.

14. The computer program product of claim 11, wherein the determining is based on an examining of shopper history data of a data repository that indicates an expected period of a user's presence within the venue.

15. The computer program product of claim 11, wherein the method includes iteratively repeating the adjusting, the determining, and the outputting until a termination condition is satisfied to terminate the notification process.

16. The computer program product of claim 11, wherein the determining the priority of users currently within the area of interest includes determining a priority of users currently within a beacon zone of the venue, and wherein the outputting the notification to a subset of the users includes outputting the notification to a subset of the users within the beacon zone.

17. The computer program product of claim 11, wherein the determining the priority of users currently within the area of interest includes for each user of a set of candidate users determining a probability that the user will react in a targeted way to receipt of the notification, and determining the priority based on a ranking of probability values of that candidate users.

18. The computer program product of claim 11, wherein the method includes performing a machine learning process to perform examining of results provided by the determining and adjusting the determining based on the examining.

19. The computer program product of claim 11, wherein the determining includes applying a function that combined weighted factors, and wherein the method includes performing a machine learning process to perform examining of results provided by the determining and adjusting the determining based on the examining, the adjusting including adjusting weights of the weighted factors.

20. A system comprising:
a memory;
at least one processor in communication with the memory; and
program instructions executable by one or more processor via the memory to perform a method comprising:
adjusting a transmission parameter associated to a notification process for outputting a notification, wherein the notification specifies an article, wherein the adjusting is based on each of a product inventory factor involving examining a remaining inventory of an article specified by the notification, a benefits inventory factor involving examining of remaining benefits available for redemption and a time of day factor that indicates a remaining time of operation of the a venue for a current day, wherein the examining remaining inventory of the article includes querying inventory data of a data repository to determining a remaining amount of the article specified in in the notification, and wherein the adjusting includes reducing a rate at which the notification specifying the article is transmitted in dependence on (a) a determination by the examining the remaining inventory of the article that an available inventory of the article has decreased, (b) a determination by the examining the remaining benefits that remaining benefits available for redemption has decreased, and (c) the remaining time of operation for the current day has decreased;
determining a priority of users currently within an area of interest, the area of interest including an area of the venue, wherein the determining a priority of users currently within an area of interest includes identifying by examination of user location data users currently within the venue, and scoring a probability of the respective identified users reacting in a targeted way to the notification, wherein the scoring a probability is based on each of a motion factor involving examining a pattern of motion of the respective identified users currently within the venue and a behavior history factor involving examining a behavior history of the respective identified users currently within the venue, wherein the determining a priority of users currently within the area of interest includes providing an ordered ranking of the respective identified users currently within the venue according to a result of performing the scoring a probability of the respective identified users reacting in a targeted way to the notification; and
outputting the notification to a subset of the users, as determined by the ordered ranking, based on the adjusting and the determining, wherein the notification is a text based notification respecting a product, wherein the determining the priority of users currently within an area of interest is based on a behavior history factor involving examining a web browsing behavior history of a user of the users, and wherein the examining includes matching a topic of the text based notification to a topic of web browsing behavior history data records of the user stored in a data repository, wherein determining a topic of the text based notification includes subjecting text based data of the text based notification to natural language processing to extract a topic classification of the text based data of the text based notification, and wherein determining a topic of the web browsing behavior history records of the user includes subjecting text based data of the web browsing behavior history records to extract a topic classification for the behavior history records.

* * * * *